United States Patent
Abe

(10) Patent No.: US 8,438,556 B2
(45) Date of Patent: May 7, 2013

(54) PERIPHERAL DEVICE CONTROL SYSTEM, ITS CONTROL METHOD, AND INFORMATION PROCESSING APPARATUS, AND COMPUTER PROGRAM AND COMPUTER-READABLE STORAGE MEDIUM

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1864 days.

(21) Appl. No.: 11/471,568

(22) Filed: Jun. 21, 2006

(65) Prior Publication Data
US 2007/0005845 A1   Jan. 4, 2007

(30) Foreign Application Priority Data

Jun. 30, 2005   (JP) .................................. 2005-193085

(51) Int. Cl.
G06F 9/44        (2006.01)
G06F 9/445       (2006.01)
G06F 13/12       (2006.01)

(52) U.S. Cl.
USPC .............................. 717/170; 717/174; 710/62

(58) Field of Classification Search ........................ None
See application file for complete search history.

(56) References Cited

U.S. PATENT DOCUMENTS

| | | | |
|---|---|---|---|
| 6,025,925 A * | 2/2000 | Davidson et al. | 358/1.15 |
| 6,671,749 B2 * | 12/2003 | Williams et al. | 710/10 |
| 6,892,299 B2 * | 5/2005 | Abe | 713/2 |
| 6,976,252 B2 * | 12/2005 | White et al. | 717/174 |
| 7,019,857 B2 | 3/2006 | Abe | |
| 7,084,999 B2 | 8/2006 | Abe | |
| 7,149,826 B2 * | 12/2006 | Howard | 710/62 |
| 7,243,347 B2 * | 7/2007 | Palmer et al. | 717/170 |
| 7,246,348 B1 * | 7/2007 | Mixer, Jr. | 717/168 |
| 7,408,662 B2 | 8/2008 | Sakura | |
| 7,793,285 B2 * | 9/2010 | Hattori et al. | 717/174 |

(Continued)

FOREIGN PATENT DOCUMENTS

| | | |
|---|---|---|
| JP | 07-006114 A | 1/1995 |
| JP | 2002-014850 A | 1/2002 |
| JP | 2003216375 A | 7/2003 |
| JP | 2004-234056 A | 8/2004 |

OTHER PUBLICATIONS

Gsottnerger et al. Embedding low-cost wireless sensors into universal plug and play environments.Wireless Sensor Networks Lecture Notes in Computer Science, 2004, pp. 291-306, Retrieved on [Jan. 25, 2013] Retrieved from the Internet: <http://download.springer.com/static/pdf/40/chp%253A10.1007%252F978-3-540-24606-0_20.pdf?auth66=135929771>.*

(Continued)

Primary Examiner — Thuy Dao
Assistant Examiner — Cheneca Smith
(74) Attorney, Agent, or Firm — Fitzpatrick, Cella, Harper & Scinto

(57) ABSTRACT

This invention has as its object to control a peripheral device by selecting optimal processing even when the version of the OS of an information processing apparatus is updated and when the version of firmware of the peripheral device is updated. To this end, according to this invention, the version information of the OS of an information processing apparatus, that of firmware of a printer, and that of a printer driver are acquired. A control method that acquires status information of the printer is set according to the acquired information.

10 Claims, 22 Drawing Sheets

| OS Version | Firmware Version | Driver Version | OPERATION OF STATUS MONITOR (IN RESIDENT STATE) |
|---|---|---|---|
| XP SP1 OR OLDER | ARBITRARY | ARBITRARY | NOT SUPPORTED DUE TO UNIDIRECTIONAL COMMUNICATION (DETAILS ARE SHOWN IN FIG.11) |
| XP SP2 | ARBITRARY | ARBITRARY | SUPPORTED BY BIDIRECTIONAL COMMUNICATION IN Null Job MODE (DETAILS ARE SHOWN IN FIG.12) |
| XP Full Bluetooth Support | 1.xx | ARBITRARY | SUPPORTED BY BIDIRECTIONAL COMMUNICATION IN Null Job MODE (DETAILS ARE SHOWN IN FIG.12) |
| | 2.00 OR NEWER | OLDER THAN 5.00 | SUPPORTED BY BIDIRECTIONAL COMMUNICATION IN Null Job MODE (DETAILS ARE SHOWN IN FIG.12) |
| | | 5.00 OR NEWER | SUPPORTED BY BIDIRECTIONAL COMMUNICATION IN Direct Read MODE (DETAILS ARE SHOWN IN FIG.13) |

U.S. PATENT DOCUMENTS

| | | | |
|---|---|---|---|
| 7,953,818 B2* | 5/2011 | Chang et al. | 709/217 |
| 2002/0062406 A1* | 5/2002 | Chang et al. | 710/1 |
| 2003/0002073 A1* | 1/2003 | Berkema et al. | 358/1.15 |
| 2003/0088866 A1* | 5/2003 | Boldon et al. | 717/170 |
| 2003/0135668 A1* | 7/2003 | Abe | 710/15 |
| 2003/0204841 A1* | 10/2003 | Nakane et al. | 717/170 |
| 2003/0234952 A1 | 12/2003 | Abe | |
| 2004/0239986 A1* | 12/2004 | Wise | 358/1.15 |
| 2005/0198650 A1* | 9/2005 | Ford et al. | 719/321 |
| 2005/0210464 A1* | 9/2005 | Machida | 717/174 |
| 2006/0168372 A1* | 7/2006 | Smith et al. | 710/62 |
| 2007/0124516 A1* | 5/2007 | Ohara et al. | 710/62 |

OTHER PUBLICATIONS

Fu et al.A framework for device capability on demand and virtual device user experience. IBM Journal of Research and Development, Sep. 2004, pp. 635-648, Retrieved on [Jan. 25, 2013] Retrieved from the Internet: <http://ieeexplore.ieee.org/xpls/abs_all.jsp?arnumber=5388835&tag=1>.*

Japanese Office Action dated Dec. 17, 2010 concerning Japanese Patent Application No. 2005-193085.

Fotonation, http:w//www.fotonatiion.com/index.php, Feb. 2007.

CIPA, http://www.cipa.jp/pictbridge/index_j.html, Apr. 2007.

* cited by examiner

↔ INDICATES ADDRESS AND DATA BUSES

FIG. 5

| | |
|---|---|
| Definition: | InkInfo |
| Node Type: | Property |
| Description: | Ink Information |
| Full Schema Path: | ¥Printer.InkInfo |
| Definition: | [Color] |
| Node Type: | Property |
| Description: | Color Information |
| Full Schema Path: | ¥Printer.InkInfo.[Color] |
| Allowed Values: | Black        // BLACK |
| | Cyan         // CYAN |
| | Magenta      // MAGENTA |
| | Yellow       // YELLOW |
| Definition: | Installed |
| Node Type: | Value |
| Data Type: | Boolean |
| Description: | WHETHER OR NOT INK OF [Color] COLOR IS INSTALLED |
| Full Schema Path: | ¥Printer.InkInfo.[Color]:Installed |
| Allowed Values: | True         // INSTALLED |
| | False        // NOT INSTALLED |
| Definition: | Level |
| Node Type: | Value |
| Data Type: | Int |
| Description: | REMAINING AMOUNT OF INK OF [Color] COLOR |
| Full Schema Path: | ¥Printer.InkInfo.[Color]:Level |
| Allowed Values: | 0~100        // INDICATE INK REMAINING AMOUNT (UNIT : %) |
| | −1           // UNKNOWN INK REMAINING AMOUNT |
| Definition: | ModelName |
| Node Type: | Value |
| Data Type: | String |
| Description: | MODEL NAME OF INK OF [Color] COLOR |
| Full Schema Path: | ¥Printer.InkInfo.[Color]:ModelName |
| Examples: | CI-B          // BLACK INK |
| | CI-C          // CYAN INK |
| | CI-M          // MAGENTA INK |
| | CI-Y          // YELLOW INK |

FIG. 6

| | | |
|---|---|---|
| <Enumeration> | | |
| - Query (Schema) - | - Retrieve (Schema) - | - Retrieve (Value) - |
| ¥ Printer.InkInfo | | |
| | ¥ Printer.InkInfo.Black:Installed | True |
| | ¥ Printer.InkInfo.Black:Level | 80 |
| | ¥ Printer.InkInfo.Black:ModelName | CI-B |
| | ¥ Printer.InkInfo.Yellow:Installed | True |
| | ¥ Printer.InkInfo.Yellow:Level | 50 |
| | ¥ Printer.InkInfo.Yellow:ModelName | CI-Y |
| | ¥ Printer.InkInfo.Magenta:Installed | True |
| | ¥ Printer.InkInfo.Magenta:Level | 0 |
| | ¥ Printer.InkInfo.Magenta:ModelName | CI-M |
| | ¥ Printer.InkInfo.Cyan:Installed | True |
| | ¥ Printer.InkInfo.Cyan:Level | 100 |
| | ¥ Printer.InkInfo.Cyan:ModelName | CI-C |

FIG. 8

- REQUEST COMMAND TRANSMITTED FROM PC -
Ink;

- INK INFORMATION RETURNED FROM PRINTER -
Ink:Black.CI-B.80,Yellow.CI-Y.50,Magenta.CI-M.0,Cyan.CI-C.100;

FIG. 9

```
- SETTING COMMAND TRANSMITTED FROM PC -
Set Ink;
```

FIG. 10

| OS Version | Firmware Version | Driver Version | OPERATION OF STATUS MONITOR (IN RESIDENT STATE) |
|---|---|---|---|
| XP SP1 OR OLDER | ARBITRARY | ARBITRARY | NOT SUPPORTED DUE TO UNIDIRECTIONAL COMMUNICATION (DETAILS ARE SHOWN IN FIG.11) |
| XP SP2 | ARBITRARY | ARBITRARY | SUPPORTED BY BIDIRECTIONAL COMMUNICATION IN Null Job MODE (DETAILS ARE SHOWN IN FIG.12) |
| XP Full Bluetooth Support | 1.xx | ARBITRARY | SUPPORTED BY BIDIRECTIONAL COMMUNICATION IN Null Job MODE (DETAILS ARE SHOWN IN FIG.12) |
| | 2.00 OR NEWER | OLDER THAN 5.00 | SUPPORTED BY BIDIRECTIONAL COMMUNICATION IN Null Job MODE (DETAILS ARE SHOWN IN FIG.12) |
| | | 5.00 OR NEWER | SUPPORTED BY BIDIRECTIONAL COMMUNICATION IN Direct Read MODE (DETAILS ARE SHOWN IN FIG.13) |

FIG. 11

```
<CALLING SEQUENCE WHICH SUCCEEDS>
StartDocPort()
WritePort()
EndDocPort()

<CALLING SEQUENCE WHICH FAILS>
ReadPort()
```

F I G. 12

<CALLING SEQUENCE WHICH SUCCEEDS>
StartDocPort()
ReadPort() / WritePort()
EndDocPort()

<CALLING SEQUENCE WHICH FAILS>
ReadPort() OTHER THAN StartDocPort() to EndDocPort()

F I G. 13

```
<CALLING SEQUENCE WHICH SUCCEEDS>
StartDocPort()
ReadPort() / WritePort()
EndDocPort()

ReadPort() OTHER THAN StartDocPort() to EndDocPort()

<CALLING SEQUENCE WHICH FAILS>
NONE
```

FIG. 14

MFG:XYZ;CMD:Raster,STS;MDL:kmmn;CLS:PRINTER;DES:XYZ kmmn;VER:1.00;

PERIPHERAL DEVICE CONTROL SYSTEM, ITS CONTROL METHOD, AND INFORMATION PROCESSING APPARATUS, AND COMPUTER PROGRAM AND COMPUTER-READABLE STORAGE MEDIUM

FIELD OF THE INVENTION

The present invention relates to a peripheral device control system which comprises an information processing apparatus and a peripheral device such as a printer or the like.

BACKGROUND OF THE INVENTION

Conventionally, as interfaces between an information processing apparatus and peripheral device, for example, a parallel interface, serial interface, IrDA, Universal Serial Bus (USB), Ethernet (R, to be abbreviated as (R) hereinafter), and the like are popularly used. As the information processing apparatus, a personal computer, digital camera, digital video camera, and the like are known. As the peripheral device, a printer (printing apparatus), copying machine, facsimile, scanner, digital camera, digital video camera, an image processing apparatus comprising combined functions of these devices, and the like are known.

In recent years, as communication interfaces between devices, Bluetooth, wireless LAN (IEEE802.11a/b/g, etc.), and IEEE1394 are newly added. As a new communication interface other than these interfaces, Picture Transfer Protocol over Internet Protocol (PTP/IP) developed by FotoNation Inc. <http://www.fotonaton.com/index.php> is available. Also, Wireless USB designed by Wireless USB Promoter Group is available. Furthermore, a new interface such as PictBridge <http://www.cipa.jp/pictbridge/index_j.html> standardized by Camera & Imaging Products Association (CIPA) or the like is used.

In order to support these new interfaces, a measure is taken by, e.g., updating some components of an OS (Operating System) of an information processing apparatus. For example, in case of the OS of Windows® XP available from Microsoft Corporation, the OS is updated by Windows® XP Service Pack, Windows® Update, QFE for updating the OS, and the like. Security is often enhanced by such updates.

When the OS is updated in this way, the firmware of a peripheral device and a driver used to control that peripheral device are updated in correspondence with the specification of the updated OS, thus providing a peripheral device control system with a specification better than ever. By enhancement of security or the like due to update of the OS, a peripheral device which normally operates under the previous OS or a driver used to control that peripheral device cannot often be operated based on the previous specification. In this case, in order to normally operate the peripheral device and its driver, the firmware of the peripheral device and the driver used to control that peripheral device must be updated.

However, when a combination of the version of the updated OS, that of the firmware of the peripheral device, and that of the driver used to control the peripheral device is not a match, the peripheral device control system often does not normally operate.

SUMMARY OF THE INVENTION

The present invention has been made in consideration of such problems, and has as its object to provide a technique for selecting optimal processing associated with control of a peripheral device from a combination of the OS of an information processing apparatus such as a personal computer or the like, and firmware of the peripheral device.

In order to achieve this object, for example, a peripheral device control system of the present invention comprises the following arrangement. That is, there is provided a peripheral device control system which includes an information processing apparatus, an application that ban run on the information processing apparatus, and a peripheral device, wherein the application comprises:

a first version information acquisition unit adapted to acquire version information of an operating system required to control the information processing apparatus;

a second version information acquisition unit adapted to acquire version information of firmware required to control the peripheral device;

a control method selection unit adapted to select a control method of the peripheral device; and a control unit adapted to control the peripheral device in accordance with the control method selected by the control method selection unit based on the information acquired by the first version information acquisition unit and the second version information acquisition unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a schema used when an application acquires information and status of inks from the printer;

FIG. 6 shows a schema and values when information and status of inks are to be enumerated using the schema defined in FIG. 5;

FIG. 8 shows transmission/reception data used when the PC acquires ink information from the printer;

FIG. 9 shows transmission data used when the PC acquires ink information from the printer;

FIG. 10 is a table showing the operation of the status monitor (in a resident state) in combinations of the version of the OS of the PC, that of the firmware of the printer, and that of a printer driver;

FIG. 11 shows calling sequences used when an LM 36 calls functions exported by a PM 37;

FIG. 12 shows calling sequences used when the LM 36 calls functions exported by the PM 37;

FIG. 13 shows calling sequences used when the LM 36 calls functions exported by the PM 37;

FIG. 14 shows an example of Device ID data to be transmitted from the printer to the PC;

DETAILED DESCRIPTION OF THE PREFERRED EMBODIMENTS

Preferred embodiments of the present invention will be described in detail hereinafter with reference to the accompanying drawings.

Of functions (information) to be quoted in the following description, those to which no details are especially attached are the functions (information) published at the site of Microsoft Developer Network (MSDN) on the Internet as of Jul. 15, 2004, and a detailed description thereof will be omitted. Also, in the following description, Bluetooth is a known wireless interface that allows bidirectional communications, and its specification has been open to the public. Hence, a detailed description thereof will also be omitted.

Figure 1:
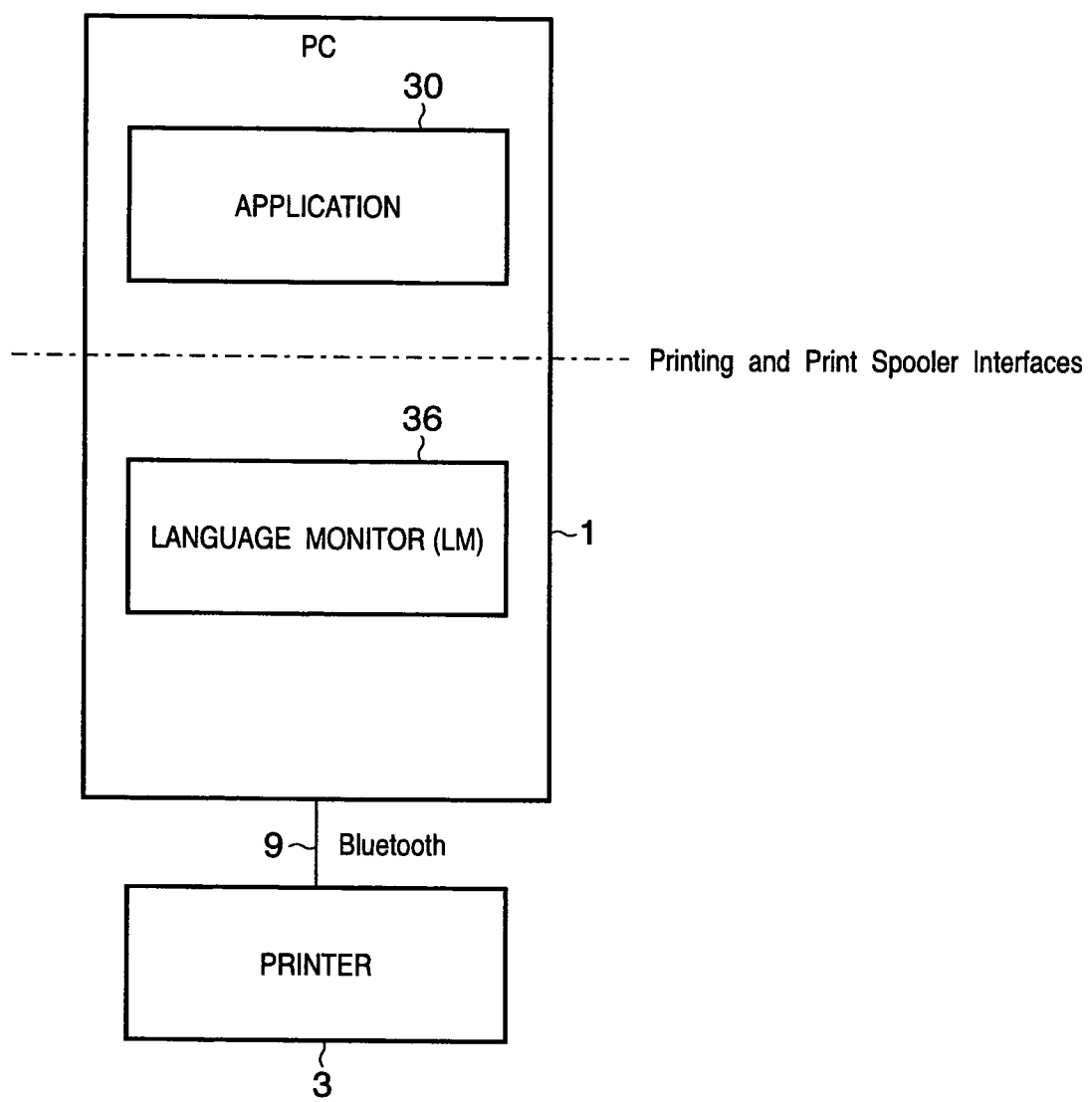
FIG. 1 is a block diagram showing the arrangement of a peripheral device control system which includes an information processing apparatus and peripheral device according to the present invention.

FIG. 1 is a block diagram showing the arrangement of a peripheral device control system which includes an information processing apparatus and peripheral device according to the present invention. Referring to FIG. 1, reference numeral 1 denotes an information processing apparatus which comprises a general personal computer (to be also abbreviated as a PC hereinafter). Assume that the PC 1 comprises the hardware arrangement shown in FIG. 2 (to be described later), and is installed with Windows® XP available from Microsoft Corporation as the OS (Operating System). Reference numeral 3 denotes a printer (printing apparatus or image forming apparatus), which comprises a color ink-jet printer and corresponds to the peripheral device of this embodiment. Assume that the printer 3 is the one with a model name "kmmn" available from XYZ Corporation. Note that the peripheral device in the present invention may be an image forming apparatus such as a printer, copying machine, facsimile, or an MFP having these functions, a scanner, digital camera, or the like. The printer 3 has the hardware arrangement shown in FIG. 3 (to be described later), and is connected to the PC 1 via a Bluetooth interface 9 to allow bidirectional communications. Reference numeral 36 denotes a language monitor (to be also abbreviated as an LM hereinafter), which will be described later with reference to FIG. 4, and comprises a dynamic link library of Windows®. Reference numeral 30 denotes an application which comprises a file (*.EXE) of an executable format for Windows®. As an example of the application 30, a status monitor which displays the status of the printer 3 or the like may be used. The application 30 can send data (information) to the LM 36 or can receive data (information) from the LM 36 by utilizing Printing and Print Spooler Interfaces published at the MSDN site. Since this is a known function of Windows® XP, a detailed description thereof will be omitted.

Figure 2:
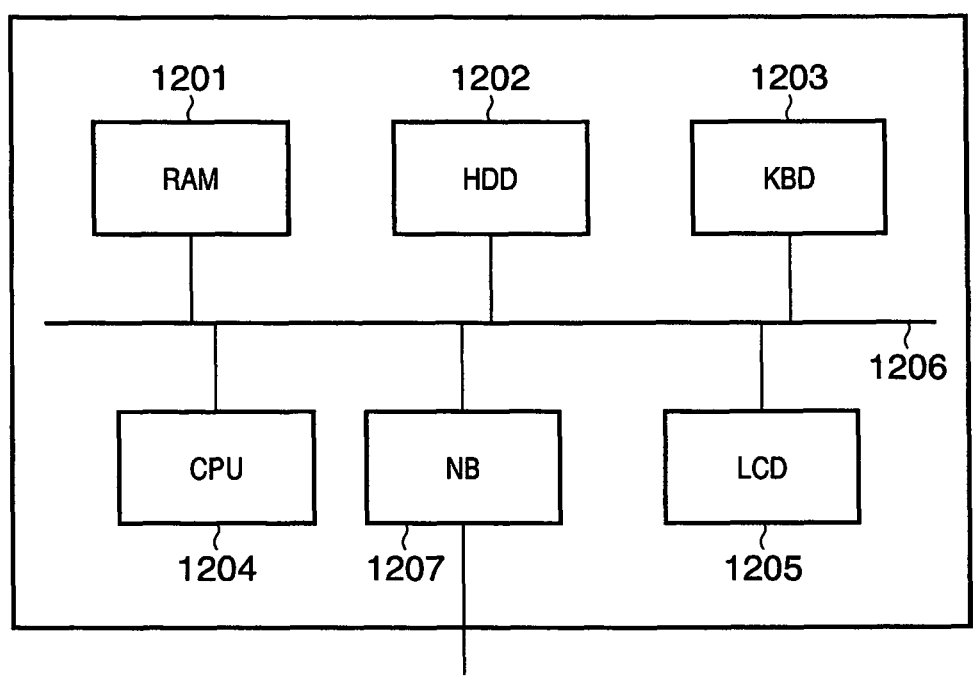
FIG. 2 is a block diagram showing an example of the hardware arrangement of a PC.

FIG. 2 is a block diagram showing an example of the hardware arrangement of a PC. In this case, the PC 1 will be exemplified. The PC 1 comprises a random access memory unit (RAM 1201), a hard disk drive unit (HDD 1202) as a storage unit, and a keyboard unit (KBD 1203) as an example of an input unit. Also, the PC 1 comprises a CPU 1204 as a control unit, a display (LCD 1205) as an example of a display unit, and a.network board (NB 1207) as an example of a communication control unit. A bus 1206 connects these units of the PC 1. The NB 1207 includes a connection port for the Bluetooth interface 9 and controls Bluetooth communications. Respective modules (the application 30 and LM 36) of the PC 1 shown in FIG. 1 are stored in the HDD 1202 and are loaded onto the RAM 1201 and are executed by the CPU 1204 as needed. In this way, the CPU 1204 implements the functions of the modules shown in FIG. 1.

Figure 3:
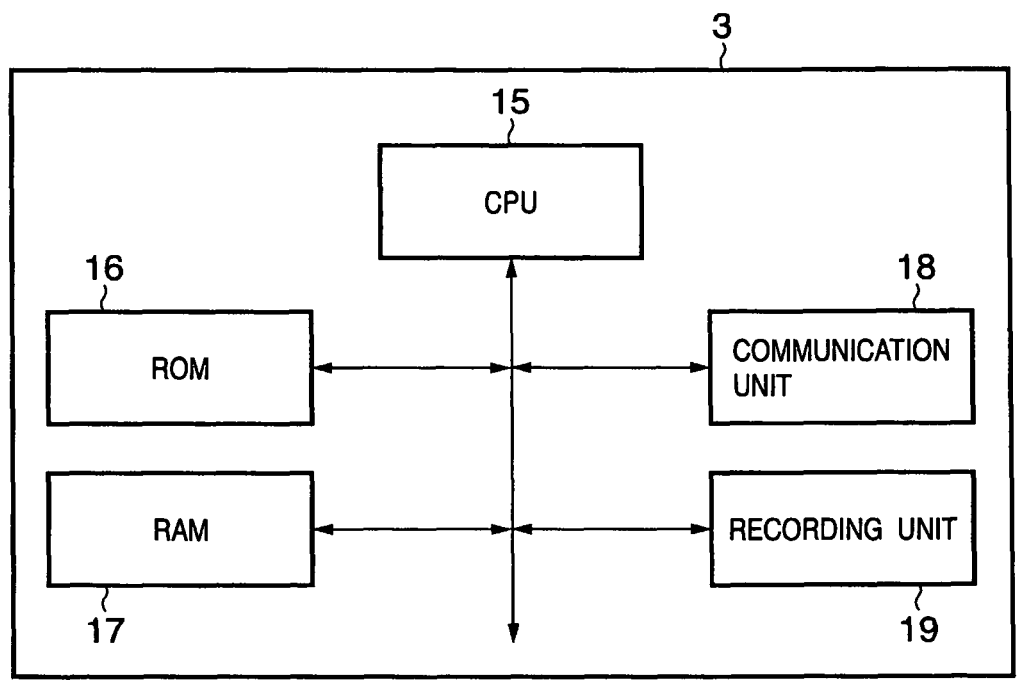
FIG. 3 is a block diagram showing the hardware arrangement of a printer.

FIG. 3 is a block diagram showing the hardware arrangement of the printer. The printer 3 has the hardware arrangement shown in FIG. 3. Referring to FIG. 3, reference numeral 15 denotes a CPU which comprises a microprocessor and the like, and controls a RAM 17, communication unit 18, and recording unit 19 in accordance with programs stored in a ROM 16 as a central processing unit of the printer 3. Programs for executing the recording (printing) processing of the printer 3 and processing for informing the PC 1 of the status of the printer 3 in response to a request from a printer driver 50 (to be described later using FIG. 4) on the PC 1 side are also stored in this ROM 16. The RAM 17 temporarily stores print data which is mainly sent from the PC 1 so as to execute printing processing by the recording unit 19 based on that data. The communication unit 18 includes a connection port for the Bluetooth interface 9, and controls Bluetooth communications.

The recording unit 19 is the one which includes a recording head of an ink-jet system, color ink cartridges, a carriage, a recording sheet convey mechanism, and the like. This recording unit 19 comprises an electric circuit that includes an ASIC and the like used to generate print pulses in the recording head based on print data.

In the above arrangement, the user inputs a print instruction on an application which runs on the PC 1 and has a printout function. As a result, the display contents (image data) of a file which is opened on that application are temporarily stored in the HDD 1202 of the PC 1 as a spool file in an EMF format. The printer driver 50 converts that spool file into print data including control commands of the printer 3, and then transmits the converted data to the printer 3 via the Bluetooth interface 9. The printer 3 receives the print data, which is converted into print pulses by the recording unit 19 to be printed on a recording sheet.

Figure 4:
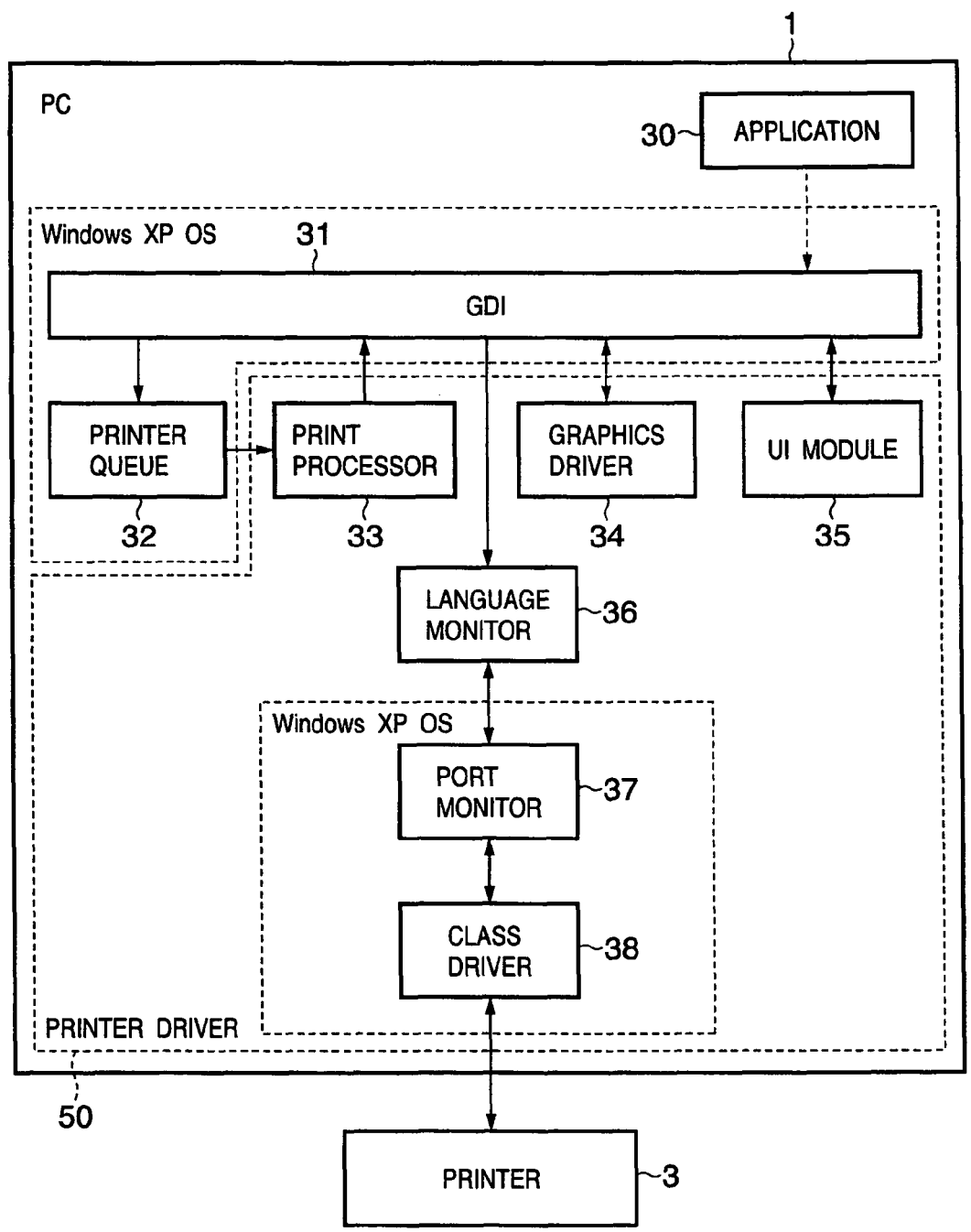
FIG. 4 is a block diagram showing the arrangement of a printer driver in the PC.

FIG. 4 is a block diagram showing the arrangement of the printer driver in the PC 1. Referring to FIG. 4, the printer driver 50 is a driver which is installed in thefPC 1 and comprises a plurality of modules 33 to 38. The application 30 is application software which can issue a print command and can display the status of the printer, and corresponds to, e.g., Notepad (Notepad.exe) or the like as a standard text editor bundled in the Windows® XP OS. Note that the application 30 of this embodiment is a status monitor or the like. Reference numeral 31 denotes a GDI (Graphics Device Interface)

which is a part of the Windows® XP OS. Reference numeral 32 denotes a printer queue which is a part of the Spooler of the Windows® XP OS, and is used to queue a print job.

The arrangement of the printer driver 50 will be described below. Reference numeral 33 denotes a print processor which is used to change a print layout and to execute special processing of a print image. Reference numeral 34 denotes a graphics driver which operates as a core of image processing of the printer driver 50, and generates a print control command by executing image processing for printing based on a drawing command sent from the GDI 31. Reference numeral 35 denotes a UI module which provides and controls a user interface of the printer driver 50. Reference numeral 36 denotes a language monitor which is described above using FIG. 1, and controls data exchange as a data communication I/F. Reference numeral 37 denotes a port monitor (to be also abbreviated as a PM hereinafter), which transmits data sent from the LM 36 to an appropriate port, and receives data sent from the printer 3 via a class driver 38. The class driver 38 is a low-level module closest to a port. The class driver 38 of this embodiment corresponds to a driver which controls the stack of Hardcopy Cable Replacement Profile (HCRP) of Bluetooth, and controls a port (Bluetooth port in the present invention).

FIG. 5 shows a schema used when the application 30 acquires information and status of inks from the printer 3. This schema is designated when the application 30 acquires information and status of inks from the printer 3 through the LM 36 via Printing and Print Spooler Interfaces. More specifically, this schema is designated as an argument when an API function IBidiSpl::SendRecv( ) of a COM interface IBidiSpl which can be used in the OS is called.

Referring to FIG. 5, "InkInfo" is "Property" indicating ink information, and the full-path designation of the schema is "¥Printer.InkInfo. "[Color]" is "Property" indicating color information, and the full-path designation of the schema is "¥Printer.InkInfo.[Color]". A value which can be set by "[Color]" is one of "Black" indicating black, "Cyan" indicating cyan, "Magenta" indicating magenta, and "Yellow" indicating yellow. For example, when black ink information is to be acquired, "¥Printer.InkInfo.Black" is designated.

"Installed" is "Value" indicating whether or not ink of [Color] color is installed, its data type is "Boolean", and the full-path designation of the schema is ¥Printer.InkInfo. [Color]:Installed. A value which can be set is one of True indicating that the ink of [Color] color is installed and False indicating that it is not installed.

"Level" is "Value" indicating the ink remaining amount, its data type is "Int", and the full-path designation of the schema is "¥Printer.InkInfo.[Color]:Level". A value which can be set is an integer ranging from 0 (unit: %) indicating no ink remaining amount to 100 (unit: %) indicating the full ink remaining amount, or −1 indicating unknown ink remaining amount.

"ModelName" is "Value" indicating the model name of ink of [Color] color, its data type is "String", and the full-path designation of the schema is ¥Printer.InkInfo.[Color]:ModelName. An example of a value which can be set is an ASCII character string such as "Examples" in FIG. 5.

"Values" such as "Installed", "Level", "ModelName", and the like are values which are to be returned from the LM 36 or printer 3 to the application 30.

In this manner, the application 30 can acquire the information and status of inks installed in the printer 3 using the schema defined in FIG. 5. As a practical example, the application 30 can acquire information indicating whether or not inks are installed, and their remaining amounts and model names.

FIG. 6 shows a schema and values upon enumerating the information and status of inks using the schema defined in FIG. 5. Referring to FIG. 6, the application 30 (status monitor or the like) designates the schema at ¥Printer.InkInfo and calls the IBidiSpl::SendRecv( ) function (Query (Schema)). As a result, the printer 3 returns a schema (Retrieve (Schema) of information and status of all the inks and values (Retrieve (Value)) as a set to the PC 1. In the example of FIG. 6, black, yellow, magenta, and cyan inks are installed in the printer 3, and the remaining amounts of these inks are respectively 80%, 50%, 0% (no ink remaining amount), and 100% (full ink remaining amount). Also, in the example of FIG. 6, the model names of the inks are respectively CI-B, CI-Y, CI-M, and Ci-C. By enumerating the information and status of the inks, the information and status of the inks can be acquired. As a practical example, information indicating whether or not inks are installed, and their remaining amounts and model names can be acquired.

Figure 7:
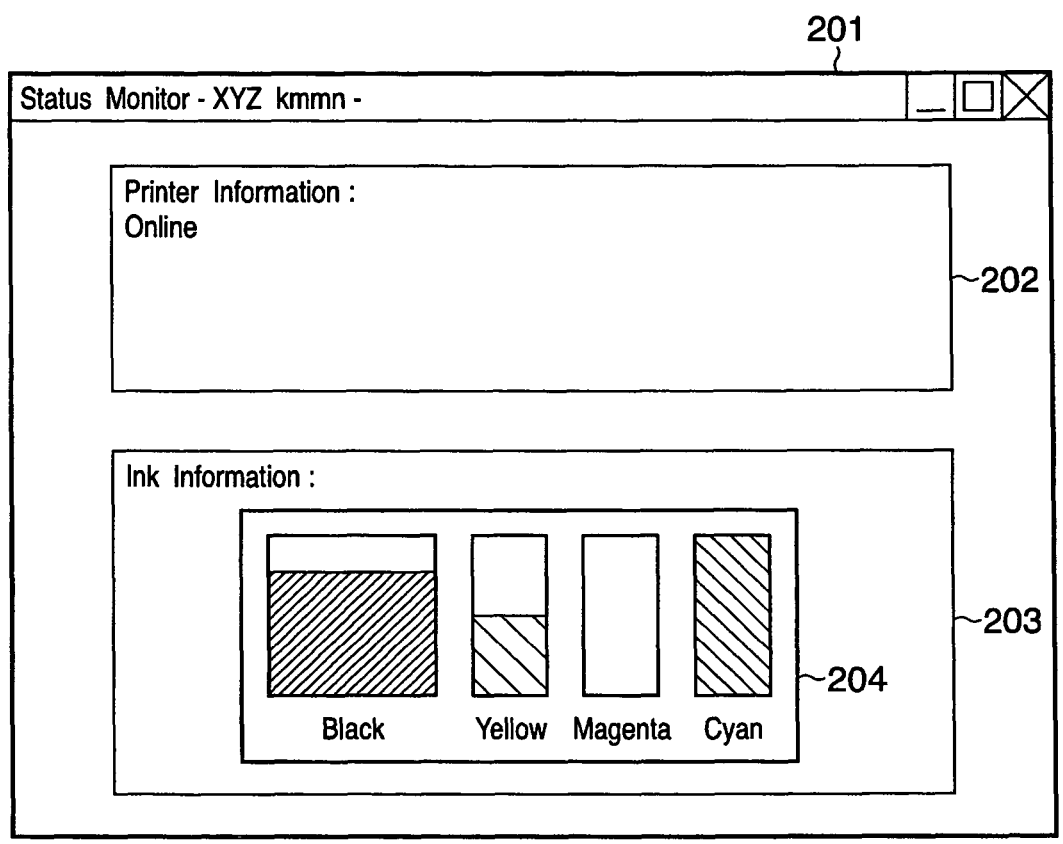
FIG. 7 shows a status monitor used to monitor the printer status.

FIG. 7 shows a GUI of the application 30 (status monitor) which is used to monitor the printer status. Referring to FIG. 7, reference numeral 201 denotes a main window of the status monitor which indicates the current status of the printer 3 (the printer with the model name "kmmn" available from XYZ Corporation). Reference numeral 202 denotes a Printer Information display area which indicates that the printer is "Online". Reference numeral 203 denotes an Ink Information display area which indicates information of inks of the printer 3. Reference numeral 204 denotes an ink remaining amount display area which displays the remaining amounts of the inks installed in the printer 3. As shown in FIG. 7, the printer 3 installs the inks of four colors, i.e., black (Black), yellow (Yellow), magenta (Magenta), and cyan (Cyan). Also, the remaining amounts of the color inks are respectively 80%, 50%, 0% (no ink remaining amount), and 100% (full ink remaining amount).

FIG. 8 shows transmission/reception data used when the PC 1 acquires ink information from the printer 3. Data to be exchanged between the PC 1 and printer 3 is binary data but it is expressed as text data in FIG. 8 after being encoded by ASCII character codes for the sake of easy understanding. Referring to FIG. 8, when the PC 1 transmits a request command: Ink; to the printer 3 via the Bluetooth interface 9, ink information is returned from the printer 3 to the PC 1 via the Bluetooth interface 9. This ink information indicates the following contents.

| \<Color\> | \<Model Name\> | \<Remaining Amount\> |
|---|---|---|
| Black | CI-B | 80% |
| Yellow | CI-Y | 50% |
| Magenta | CI-M | 0% |
| Cyan | CI-C | 100% |

Note that this specification does not depend on the version of the firmware of the printer, and it is supported by the printer 3 that installs firmware of an arbitrary version.

FIG. 9 shows transmission data used when the PC 1 acquires ink information from the printer 3. Data to be exchanged between the PC 1 and printer 3 is binary data but it is expressed as text data in FIG. 9 after being encoded by ASCII character codes for the sake of easy understanding. Referring to FIG. 9, when the PC 1 transmits a setting command: Set Ink; to the printer 3 via the Bluetooth interface 9, and the printer 3 receives this setting command, the printer 3 starts an ink information return mode (details will be described later using FIGS. 15 and 16). Note that this specification does not depend on the version of the firmware of the printer, and it is supported by the printer 3 that installs firmware of an arbitrary version.

FIG. 10 is a table showing the operation of the status monitor (in a resident state) in combinations of the version of the OS of the PC 1, that of the firmware of the printer, and that of the printer driver. In FIG. 10, an [OS Version] column describes the version information of the OS of the PC 1. A [Firmware Version] column describes the version information of the firmware of the printer 3. A [Driver Version] column describes the version information of the printer driver 50. A [Operation of Status Monitor (in resident state)] column describes the operation when the status monitor is launched and resides.

Note that the state in which the status monitor is launched and resides means a state in which the status monitor is launched at the time other than printing, and the status of the printer 3 is monitored all the time.

As shown in FIG. 10, when the version information of the OS of the PC 1 is older than Windows® XP Service Pack 1 (SP1), a unidirectional communication by only transmission via a Bluetooth communication from the PC 1 to the printer 3 is allowed based on the specification of the OS. Therefore, the status monitor cannot acquire the status of the printer 3 independently of the version information of the firmware of the printer 3 and that of the printer driver 50. That is, the status monitor 30 as the application cannot support the version older than Windows® XP Service Pack 1 (SP1) of the OS of the PC 1. Note that the specification of the OS in this case will be described later using FIG. 11.

When the version information of the OS of the PC 1 is Windows® XP Service Pack 2 (SP2), transmission/reception can be made via Bluetooth communications between the PC 1 and printer 3 within a print job based on the specification of the OS. Also, the printer 3 which installs firmware of an arbitrary version supports such transmission/reception within a print job under the control of the printer driver 50 of an arbitrary version. Therefore, the printer 1 supports the operation of the status monitor by bidirectional communication in a Null Job mode. Note that the specification of the OS and bidirectional communications in the Null Job mode will be described later using FIG. 12.

When the version information of the OS of the PC 1 is Windows® XP Full Bluetooth Support, transmission/reception can be made via Bluetooth communications in an arbitrary case based on the specification of the OS. The printer 3 which installs the firmware of version No. 1.xx supports transmission/reception within a print job under the control of the printer driver of an arbitrary version. Also, the printer 3 supports the operation of the status monitor via bidirectional communications in the Null Job mode.

The printer 3 which installs the firmware of version No. 2.00 or newer supports transmission/reception within a print job and transmission to the PC 1 in other cases under the control of the printer driver 50 of version No. 5.00 or newer. Therefore, the printer 3 supports the operation of the status monitor via bidirectional communications in a Direct Read mode. The printer 3 supports transmission/reception within a print job under the control of the printer driver 50 older than version No. 5.00 but it does not support transmission to the PC 1 in other cases. Hence, the printer 3 supports the operation of the status monitor via the bidirectional communications in the Null Job mode. Note that the specification of the OS and bidirectional communications in the Direct Read mode will be described later using FIG. 13.

In this way, the status monitor performs different operations depending on the combinations of the version of the OS of the PC 1, that of the firmware of the printer 3, and that of the printer driver 50. Of these operations, an ideal operation of the status monitor corresponds to a case in which bidirectional communications in the Direct Read mode that can acquire information indicating the printer status at an arbitrary timing are used. Note that Windows® XP Full Bluetooth Support as the version information of the OS and bidirectional communications in the Direct Read mode in Bluetooth communications correspond to new specifications proposed by the present invention. That is, they are new specifications which are not supported by updating of the OS such as Windows® XP, Windows® XP Service Pack, Windows® Update, QFE that updates the OS, and the like.

FIG. 11 shows calling sequences used when the LM 36 calls functions exported by the PM (port monitor) 37. FIG. 11 shows a case wherein the version information of the OS of the PC 1 is older than Windows® XP Service Pack 1 (SP1). Referring to FIG. 11, when a print job starts, the Spooler of the Windows® XP OS calls a StartDocPort( ) function exported by the LM 36, and the LM 36 calls the StartDocPort( ) function within this function. After that, the LM 36 calls a WritePort( ) function exported by the PM 37 and transmits a control command at the beginning of printing to the printer 3, thus starting the print job.

Upon completion of the print job, the Spooler calls an EndDocPort( ) function exported by the LM 36, and the LM 36 calls the EndDocPort( ) function exported by the PM 37 within this function. After that, the LM 36 calls the WritePort( ) function exported by the PM 37 and transmits a control command at the end of printing to the printer 3, thus ending the print job.

In this way, an interval from when the Spooler calls StartDocPort( ) exported by the LM 36 until it calls EndDocPort( ) exported by the LM 36 represents that within a print job. Within this print job, the LM 36 can transmit the print control command to the printer 3 by calling the WritePort( ) function exported by the PM 37.

The PM 37 exports a ReadPort( ) function required to receive data to be transmitted from the printer 3 to the PC 1. However, when the version information of the OS of the PC 1 is older than Windows® XP Service Pack 1 (SP1), as shown in FIG. 11, since the LM 36 fails to call the ReadPort( ) function even if it calls this function, the LM 36 cannot receive data to be transmitted from the printer 3 to the PC 1.

FIG. 12 shows calling sequences when the LM 36 calls functions exported by the PM 37. FIG. 12 shows a case wherein the version information of the OS is Windows® XP Service Pack 2 (SP2). In FIG. 12, when a print job starts, the Spooler of the Windows® xP OS calls a StartDocPort( ) function exported by the LM 36, and the LM 36 calls the StartDocPort( ) function within this function. After that, the LM 36 calls a WritePort( ) function exported by the PM 37 and transmits a control command at the beginning of printing to the printer 3, thus starting the print job.

Upon completion of the print job, the Spooler calls an EndDocPort( ) function exported by the LM 36, and the LM 36 calls the EndDocPort( ) function exported by the PM 37 within this function. After that, the LM 36 calls the WritePort( ) function exported by the PM 37 and transmits a control command at the end of printing to the printer 3, thus ending the print job.

In this way, an interval from when the Spooler calls StartDocPort( ) exported by the LM 36 until it calls EndDocPort( ) exported by the LM 36 represents that within a print job. Within this print job, the LM 36 can transmit the print control command to the printer 3 by calling the WritePort( ) function exported by the PM 37. The PM 37 exports a ReadPort( ) function required to receive data to be transmitted from the printer 3 to the PC 1. However, when the version information of the OS of the PC 1 is Windows® XP Service Pack 2 (SP2), as shown in FIG. 12, the LM 36 can call this ReadPort( ) function within the print job. When the printer 3 prepares for data to be transmitted to the PC 1, the LM 36 can receive this data by calling the ReadPort( ) function within the print job. Since the LM 36 fails to call the ReadPort( ) function even if it calls this function at a timing other than that within the print job, the LM 36 cannot receive data to be transmitted from the printer 3 to the PC 1 at a timing other than that within the print job.

FIG. 13 shows calling sequences when the LM 36 calls functions exported by the PM 37. FIG. 13 shows a case wherein the version information of the OS is Windows® XP Full Bluetooth Support.

Referring to FIG. 13, when a print job starts, the Spooler of the Windows® XP OS calls a StartDocPort( ) function exported by the LM 36, and the LM 36 calls the StartDocPort( ) function within this function. After that, the LM 36 calls a WritePort( ) function exported by the PM 37 and transmits a control command at the beginning of printing to the printer 3, thus starting the print job.

Upon completion of the print job, the Spooler calls an EndDocPort( ) function exported by the LM 36, and the LM 36 calls the EndDocPort( ) function exported by the PM 37 within this function. After that, the LM 36 calls the WritePort( ) function exported by the PM 37 and transmits a control command at the end of printing to the printer 3, thus ending the print job.

In this way, an interval from when the Spooler calls StartDbcPort( ) exported by the LM 36 until it calls EndDocPort( ) exported by the LM 36 represents that within a print job. Within this print job, the LM 36 can transmit the print control command to the printer 3 by calling the WritePort( ) function exported by the PM 37. The PM 37 exports a ReadPort( ) function required to receive data to be transmitted from the printer 3 to the PC 1. However, when the version information of the OS of the PC 1 is Windows® XP Full Bluetooth Support, as shown in FIG. 13, the LM 36 can call this ReadPort( ) function within the print job. When the printer 3 prepares for data to be transmitted to the PC 1, the LM 36 can receive this data by calling the ReadPort( ) function within the print job. Furthermore, the LM 36 can call this ReadPort( ) function at a timing other than that within the print job. The LM 36 can receive this data by calling the ReadPort( ) function at a timing other than that within the print job.

FIG. 14 shows an example of Device ID data to be transmitted from the printer to the PC. FIG. 14 shows an example of Device ID data to be transmitted from the printer 3 to the PC 1. "MFG" represents that the manufacturer of the printer 3 is XYZ Corporation. "CMD" represents that control commands supported by the printer 3 are "Raster" and "STS". Also, "MDL" represents that the model name of the printer 3 is "kmmn", and "CLS" represents that the device class of the printer 3 is "PRINTER". In addition, "DES" represents that the device description of the printer 3 is "XYZ kmmn", and "VER" represents that the version information of the firmware of the printer 3 is "1.00". For example, when the firmware of the printer has been updated, and only the version information in the Device ID data shown in FIG. 14 has been changed to "2.00", the Device ID data in which "VER" is changed to "VER:2.00;" in FIG. 14 is to be transmitted.

The operation of the embodiment of the present invention will be described below with reference to the flowcharts of FIGS. 15 to 21.

Figure 15:
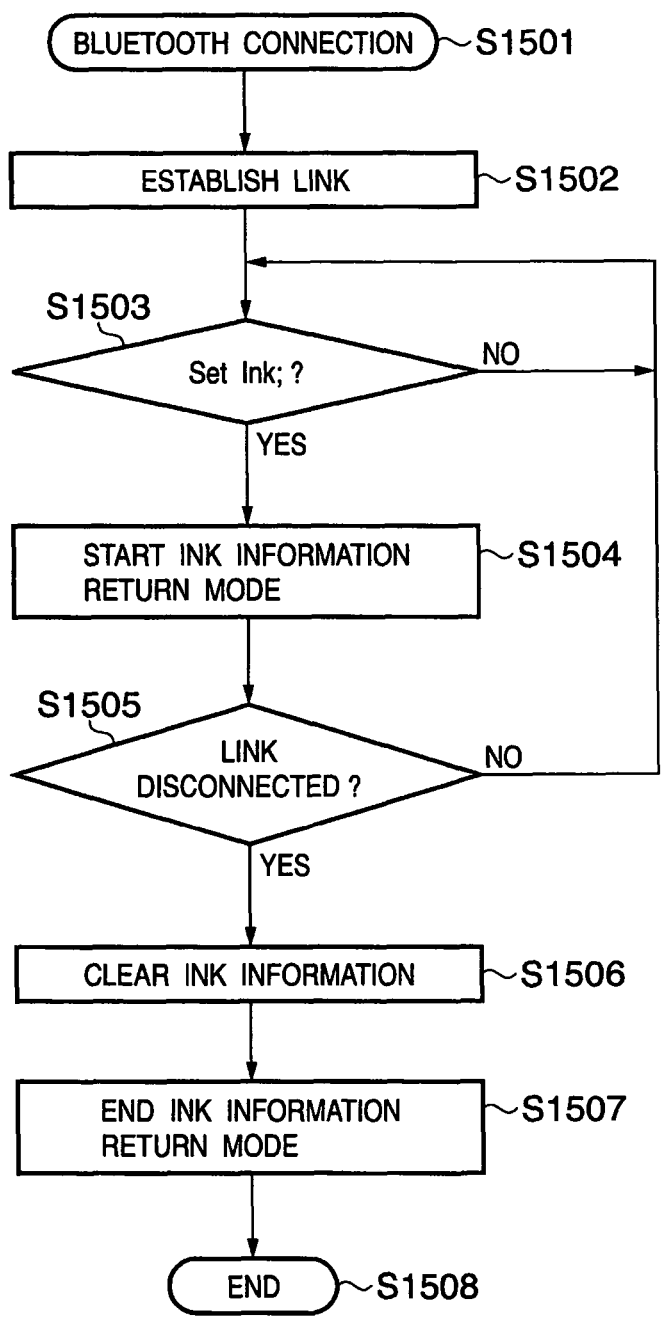
FIG. 15 is a flowchart showing processing from the start to the end of connection of a Bluetooth communication by the printer.

FIG. 15 is a flowchart showing processing from the start to the end of connection of a Bluetooth communication by the printer 3. FIG. 15 shows processing when the version of the firmware of the printer 3 is 1.xx.

Referring to FIG. 15, when the printer 3 starts connection of a Bluetooth communication (step S1501), a connection link of the Bluetooth communication is established (step S1502).

Next, the printer 3 checks if a setting command: Set Ink; is received from the PC 1 (step S1503). If it is determined that no setting command: Set Ink; is received from the PC 1, the flow returns to step S1503. If it is determined that the setting command: Set Ink; is received from the PC 1, the printer 3 prepares for ink information, and starts an ink information return mode in which it can return ink information in response to a read request from the PC 1 anytime (step S1504).

The printer 3 checks if the connection link of the Bluetooth communication is disconnected (step S1505). If it is determined in step S1505 that the connection link of the Bluetooth communication is maintained, the flow returns to step S1503. If it is determined that the connection link of the Bluetooth communication is disconnected, the printer 3 clears the prepared ink information (step S1506), ends the ink information return mode (step S1507), and ends the connection of the Bluetooth communication (step S1508).

During processing in the ink information return mode, the printer 3 returns the ink information shown in FIG. 8 in response to a read request from the PC 1.

Figure 16:
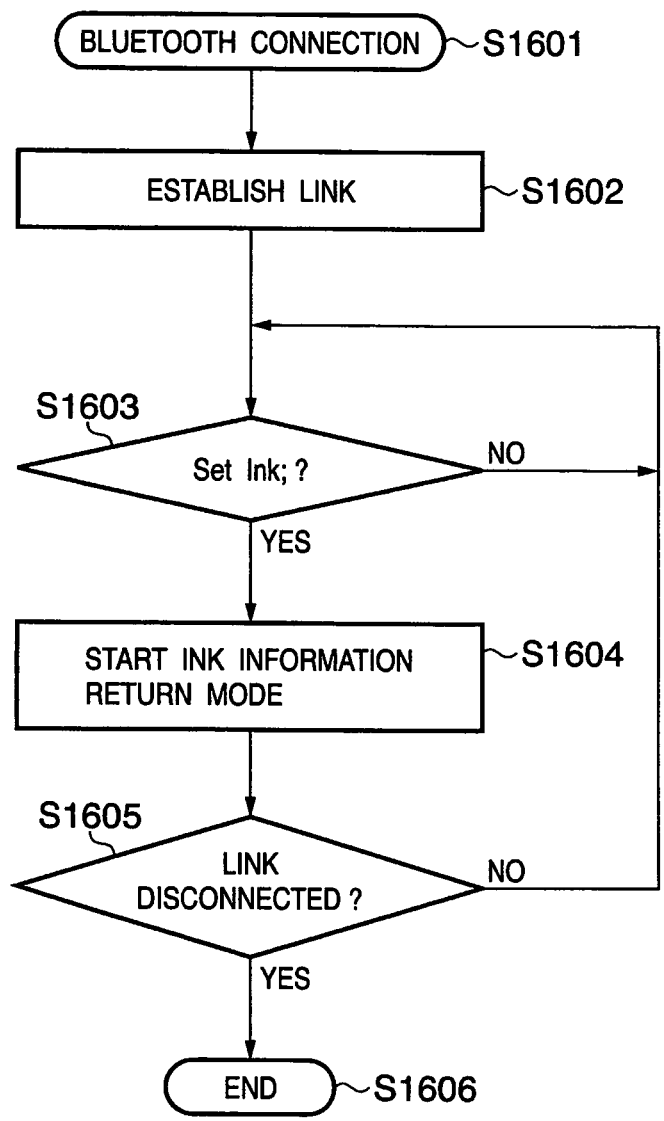
FIG. 16 is a flowchart showing processing from the start to the end of connection of a Bluetooth communication by the printer.

FIG. 16 is a flowchart showing processing from the start to the end of connection of a Bluetooth communication by the printer 3. FIG. 16 shows processing when the version of the firmware of the printer 3 is 2.00 or newer.

Referring to FIG. 16, when the printer 3 starts connection of a Bluetooth communication (step S1601), a connection link of the Bluetooth communication is established (step S1602).

Next, the printer 3 checks if a setting command: Set Ink; is received from the PC 1 (step S1603). If NO in step S1603, the flow returns to step S1603. If it is determined that the setting command: Set Ink; is received from the PC 1, the printer 3 prepares for ink information, and starts an ink information return mode in which it can return ink information in response to a read request from the PC 1 anytime (step S1604).

The printer 3 checks if the connection link of the Bluetooth communication is disconnected (step S1605). If the communication connection is maintained, the flow returns to step S1603. If it is determined that the communication connection is disconnected, the printer 3 ends the connection of the Bluetooth communication (step S1606).

During processing in the ink information return mode, the printer 3 returns the ink information shown in FIG. 8 in response to a read request from the PC 1.

Next, the main processing of the application (status monitor) 30 on the PC 1 side according to this embodiment will be described below with reference to the flowchart of FIG. 17.

Figure 17:
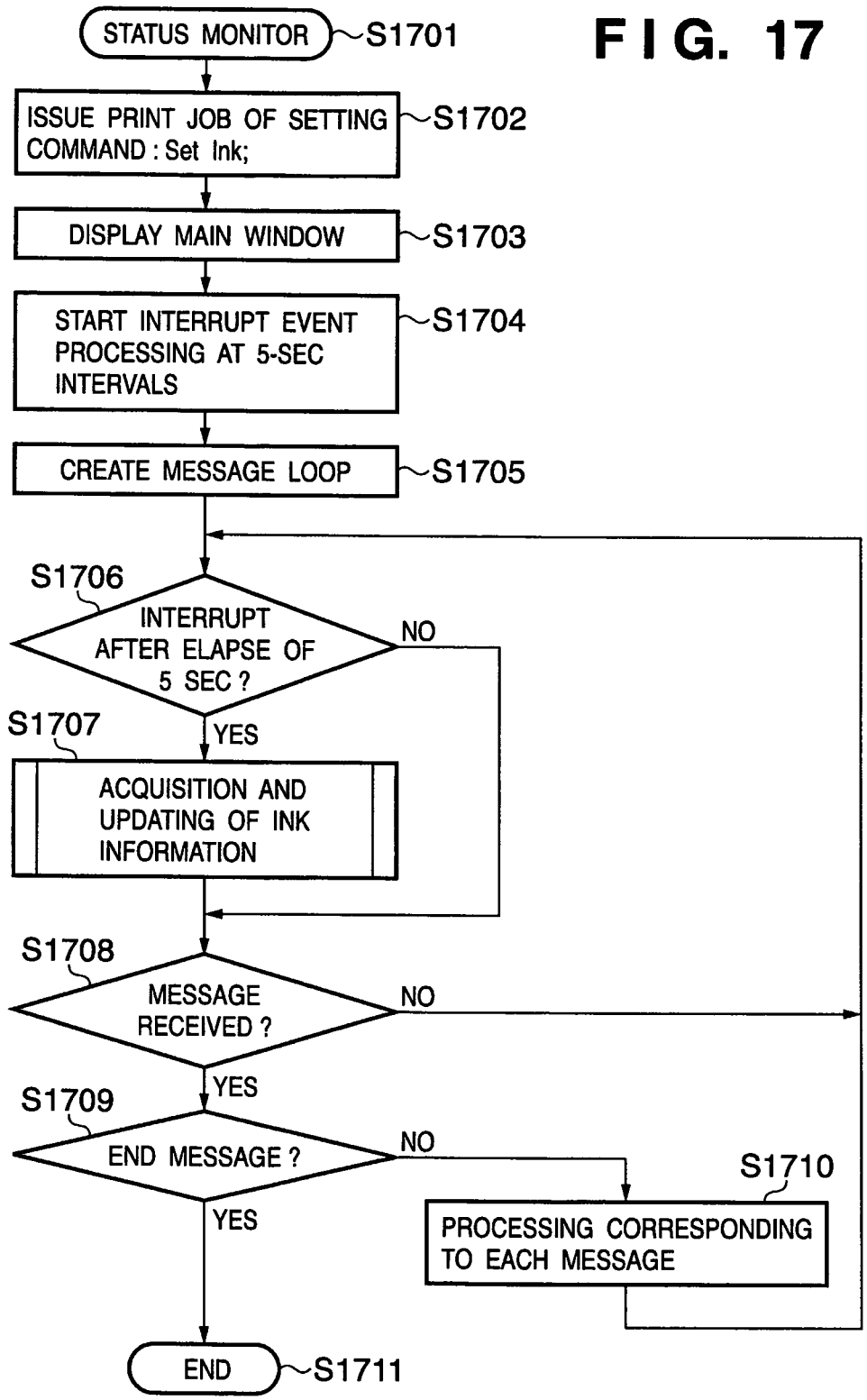
FIG. 17 is a flowchart showing main processing of an application (status monitor)

Referring to FIG. 17, when the application 30 (status monitor) is launched (step S1701), it issues a print job required to transmit a setting command: Set Ink; to the printer 3 (S1702).

The application 30 then displays the main window 201 of the status monitor (step S1703). After that, the application 30 starts interrupt event processing at 5-sec time intervals (step S1704) and creates a message loop (step S1705).

If an interrupt after an elapse of 5 sec is generated (step S1706), the application 30 executes acquisition and update processing of ink information (to be described later using FIG. 18) (step S1707). If it is determined that no interrupt after an elapse of 5 sec is generated, the flow skips the processing in step S1707, and jumps to step S1708.

Next, the application 30 checks if a message is received (step S1708). If no message is received, the flow returns to step S1706 to prepare for the next interrupt event.

If it is determined that a message is received, the application 30 checks if the received message is an end message (S1709). If it is determined that the received message is other than an end message, the application 30 executes various kinds of processing corresponding to that message (step S1710), and the flow returns to step S1706.

If it is determined that the received message is an end message, the application 30 (status monitor) ends (step S1711).

Next, the processing executed when the application (status monitor) of this embodiment acquires ink information of the printer and updates the display contents of the ink information (step S1707) will be described below with reference to the flowchart of FIG. 18.

Figure 18:
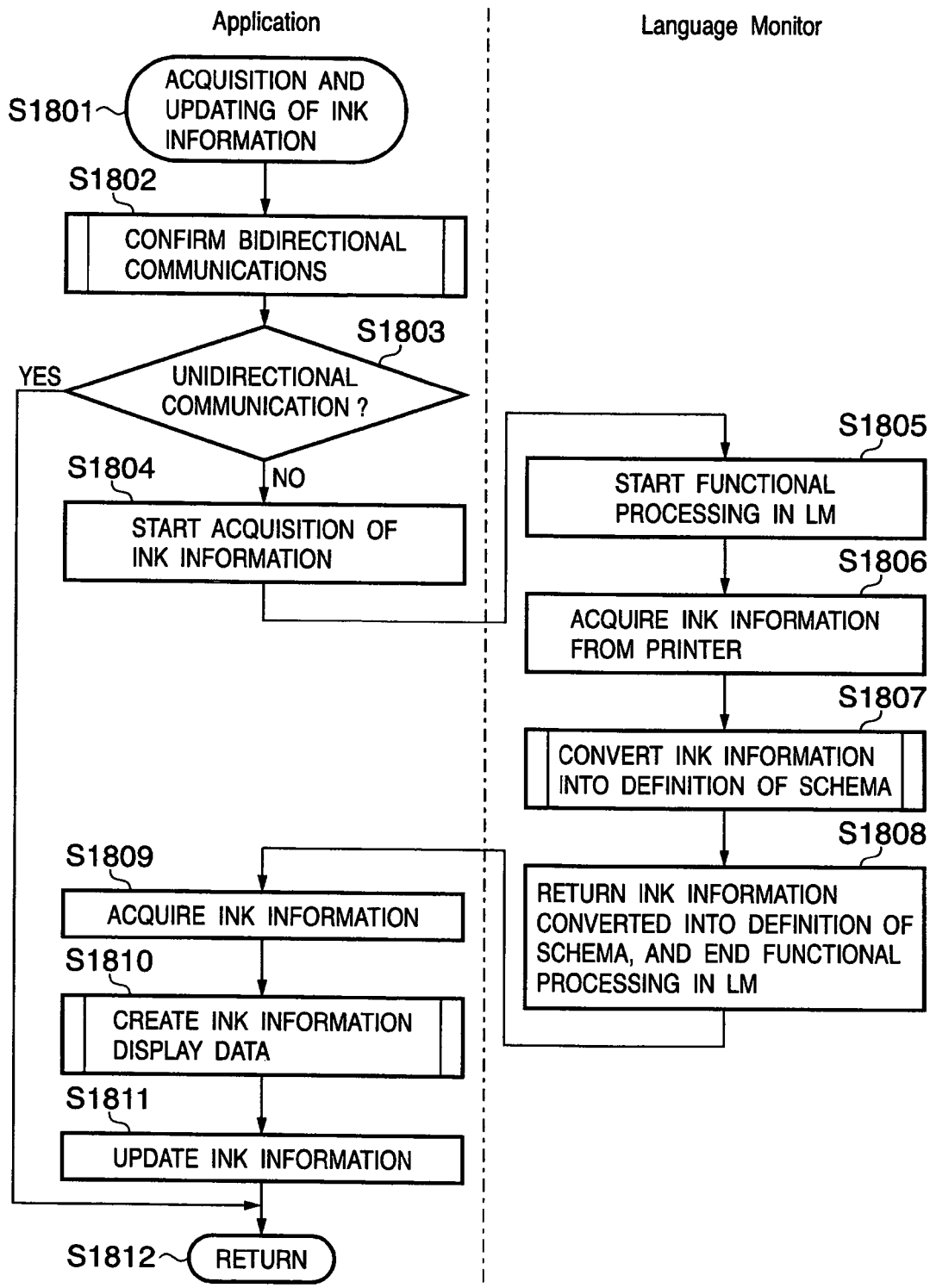
FIG. 18 is a flowchart showing processing executed when the application (status monitor) acquires ink information of the printer and updates the display contents of the ink information.

Referring to FIG. 18, the application 30 (status monitor) starts processing for acquiring ink information of the printer 3 and updating the display contents of the ink information (step S1801). After that the application 30 confirms bidirectional communications in FIG. 19 (to be described later) (step S1802). The application 30 then checks if information which is stored in the registry of the OS and is associated with a communication indicates a unidirectional communication (step S1803). If it is determined that the stored information indicates a unidirectional communication, the flow returns without any processing for acquiring ink information of the printer 3 and updating the display contents of the ink information (step S1812).

If it is determined in step S1803 that the communication information stored in the registry does not indicate a unidirectional communication, i.e., it is determined that the stored information indicates bidirectional communications in the Null Job mode or those in the Direct Read mode, the flow advances to step S1804. In step S1804, the application 30 starts acquisition of ink information by calling the API function IBidiSpl::SendRecv( ) of the COM interface IBidiSpl using the schema of ¥Printer.InkInfo defined in FIG. 5 as an argument (step S1804).

As a result, the Spooler calls a SendRecvBidiDataFromPort( ) function exported by the LM 36 via the Printing and Print Spooler Interfaces to start processing in this function (step S1805). If a ReadPort( ) function exported by the PM 37 is called in the SendRecvBidiDataFromPort( ) function exported by the PM 37, a read request is issued from the PC 1 to the printer 3. As a result, since the printer 3 returns ink information shown in FIG. 8 to the PC 1 in response to this read request, the LM 36 acquires that ink information (step S1806), and converts the acquired ink information in accordance with the definition of the schema of ¥Printer.InkInfo designated as the argument of the SendRecvBidiDataFromPort( ) function (to be described later using FIG. 20) (step S1807). The LM 36 returns the ink information which is converted into the definition of the schema, as shown in FIG. 6, as the argument of the SendRecvBidiDataFromPort( ) function to the application, thus ending its processing of the SendRecvBidiDataFromPort( ) function (step S1808).

In the application 30 (status monitor), the IBidiSpl::SendRecv( ) function is returned, and the ink information returned as the definition of the schema shown in FIG. 6 as the argument is acquired (step S1809). The application 30 creates data for ink information display (to be described later using FIG. 21) (step S1810), and updates the ink information using this data (step S1811). In step S1811, the application 30 (status monitor) also executes processing for acquiring ink information of the printer 3 and updating the display contents of the ink information. After that, this processing returns (step S1812).

Figure 19:
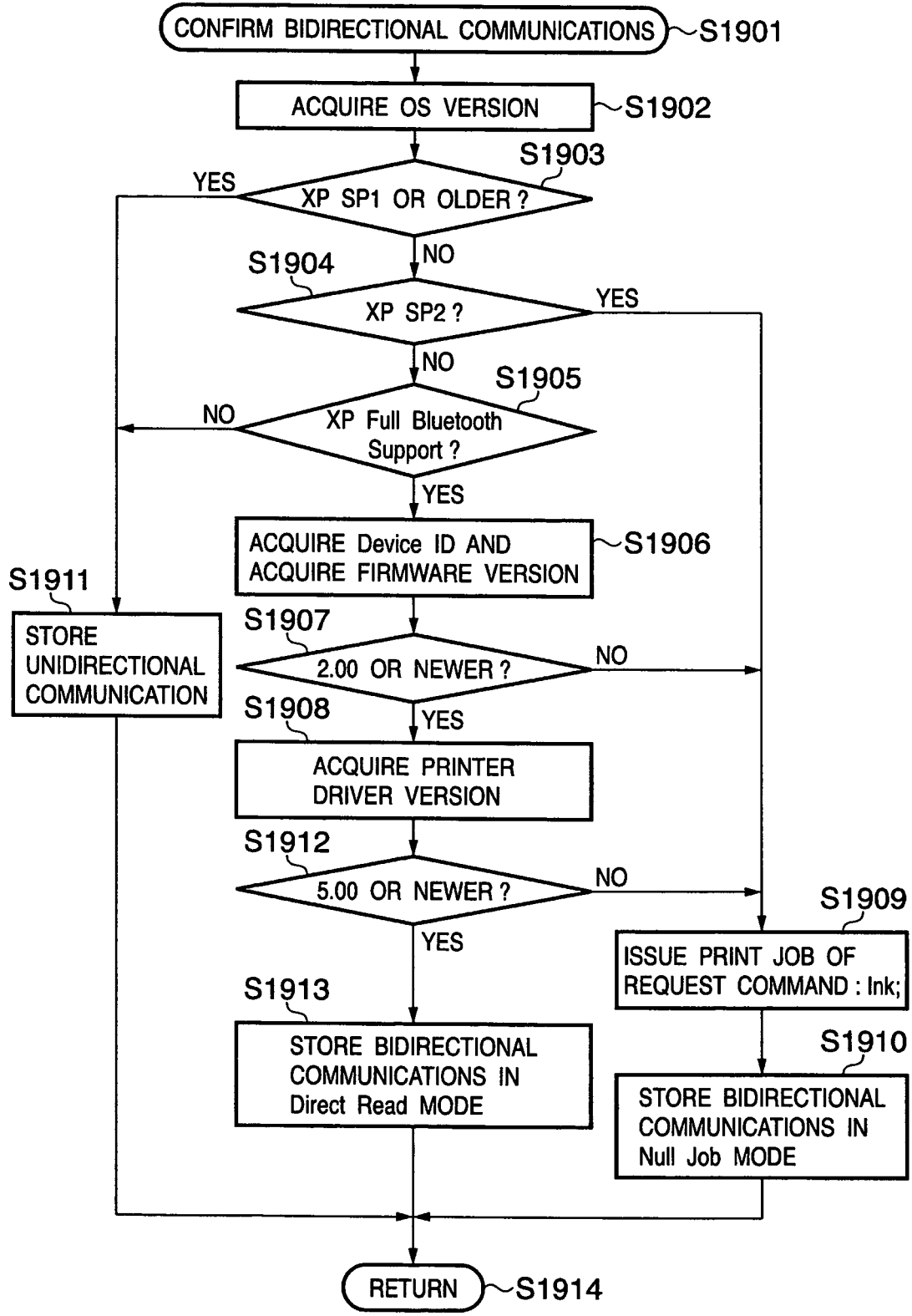
FIG. 19 is a flowchart showing confirmation processing of bidirectional communication of the application (status monitor)

FIG. 19 is a flowchart showing details of the confirmation processing (step S1802) of bidirectional communications in the application (status monitor) according to this embodiment.

Referring to FIG. 19, when the application 30 (status monitor) starts the confirmation processing of bidirectional communications (step S1901), it acquires the version information of the OS using a GetVersionEx( ) function of Win32 API (step S1902). The application 30 then checks if the acquired version of the OS is older than Windows® XP SP1 (step S1903).

If it is determined that the version of the OS is older than Windows® XP SP1, since the Bluetooth communication to be used by the application of this embodiment is a unidirectional communication, the application 30 stores information indicating this in the registry (step S1911), and the flow returns to the main processing (step S1914).

If it is determined in step S1903 that the version of the OS is newer than Windows® SP1, the flow advances to step S1904 to check if the version of the OS is Windows® XP SP2. If it is determined that the version of the OS is Windows® XP SP2, the application 30 issues a print job of a request command: Ink; (step S1909). The application 30 stores information indicating that the type of communication is bidirectional communications in the Null Job mode in the registry (step S1910), and the flow returns to the main processing (step S1914).

On the other hand, if it is determined in step S1904 that the version of the OS is not Windows® SP2, the flow advances to step S1905 to check if the version of the OS is XP Full Bluetooth Support. If it is determined that the version of the OS is XP Full Bluetooth Support, the application 30 acquires Device ID data from the printer 3 and acquires the version information of the firmware of the printer 3 from the acquired Device ID data shown in FIG. 14 (step S1906). The application 30 checks if the version of the firmware of the printer 3 is 2.00 or newer (step S1907). If it is determined that the version of the firmware of the printer 3 is older than 2.00, i.e., it is 1.xxx, the application 30 executes processing in step S1909. If it is determined that the version of the firmware of the printer 3 is 2.00 or newer, the flow advances to step S1908.

In step S1908, the application 30 acquires the version of the printer driver 50 installed in the PC 1. The application 30 then checks in step S1912 if the version of the printer driver 50 is 5.00 or newer. If it is determined that the version of the printer driver 50 is 5.00 or newer, since bidirectional communications in the Direct Read mode can be made as the type of communication, the application 30 stores information indicating Direct Read in the registry (step S1913), and the flow returns to the main processing (step S1914).

If it is determined in step S1912 that the version of the printer driver is older than 5.00, the flow advances to step S1909. On the other hand, if it is determined in step S1905 that the version of the OS is not XP Full Bluetooth Support, it is determined that the version of the OS is unknown, and the flow advances to step S1911.

Upon reception of the print job (request command: Ink;) issued in step S1909, the printer 3 prepares for ink information which is returned once as that to be returned from the printer in FIG. 8 in response to a read request from the PC 1 later. In a case wherein the print job of the request command:

Ink; is issued in step S1909, a print job must be issued every time the confirmation processing of bidirectional communications is done, so as to acquire information from the printer 3. This embodiment defines this mode as bidirectional communications in the Null Job mode.

In a case wherein the flow goes through step S1913, no print job issued in step S1909 is required to acquire ink information from the printer 3. This embodiment defines this mode as bidirectional communication in the Direct Read mode. The use of the bidirectional communication in the Direct Read mode is an ideal implementation means with a highest efficiency.

Figure 20:
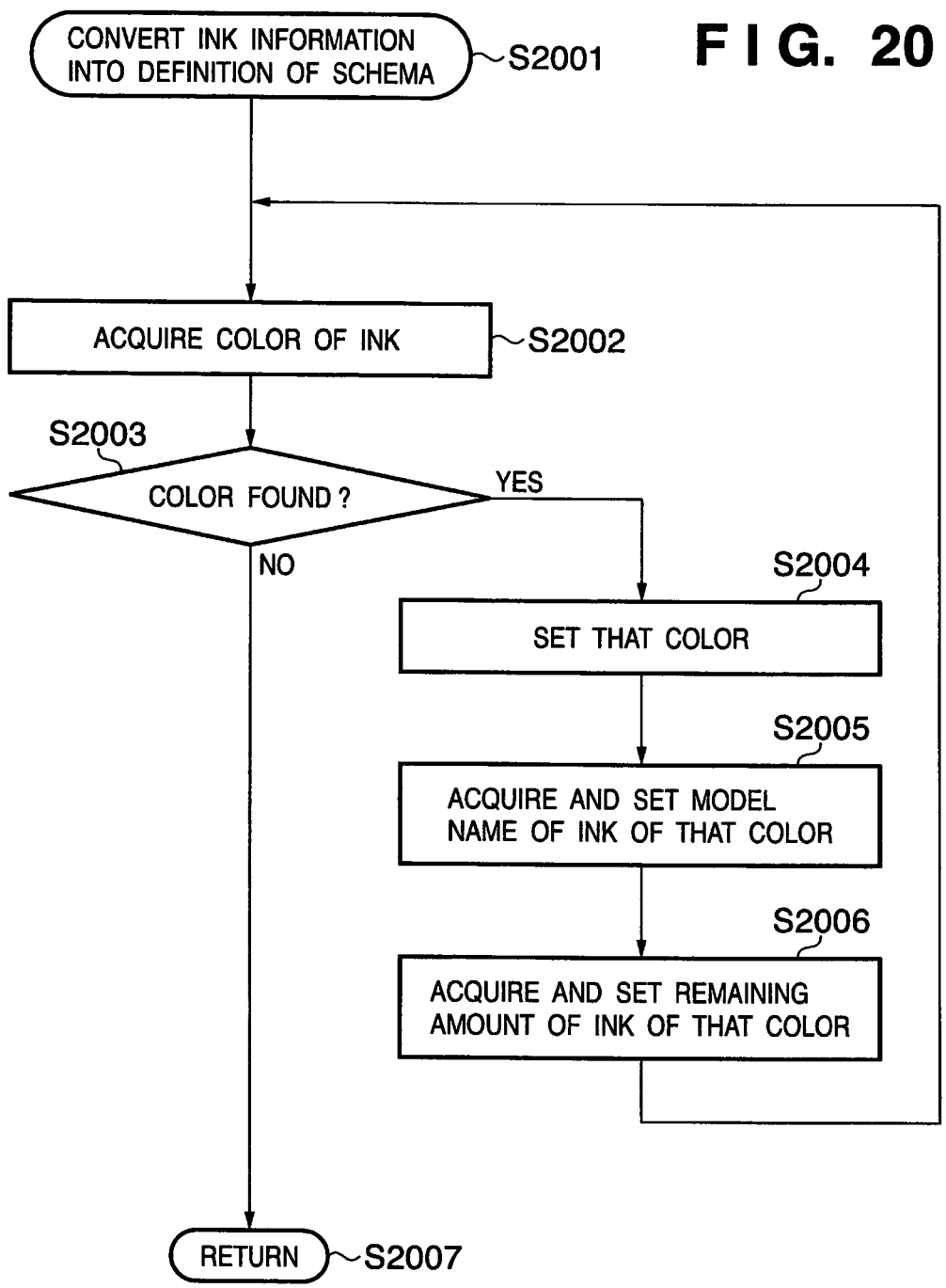
FIG. 20 is a flowchart showing processing for converting ink information into the definition of a schema in the LM.

FIG. 20 is a flowchart showing the processing for converting the ink information into the definition of the schema in the LM 36 (details of step S1807 in FIG. 18).

Referring to FIG. 20, when the processing for converting ink information into the definition of the schema is started in the LM 36 (step S2001), the color of ink is acquired from the ink information returned from the printer 3 acquired in step S1806 in FIG. 18 (step S2002). If the color is detected (found) (step S2003), that color is set in a return value storage buffer (memory) upon returning in step S2007 (step S2004). Also, the model name of the ink of that color is acquired and is set in the return value storage buffer (memory) upon returning in step S2007 (step S2005). The remaining amount of the ink of that color is acquired and is set in the return value storage buffer (memory) upon returning in step S2007 (step S2006). The flow then returns to step S2002.

If no color is detected (found) in step S2003, this means that processing for all the inks of colors is completed. Therefore, the flow returns to the main processing to return the colors ([Color] in FIG. 5), information indicating if the inks of the colors are installed (Installed in FIG. 5), the model names of the inks of the colors (ModelName in FIG. 5), and the remaining amounts of the inks of the colors (Level in FIG. 5) set in the return value storage buffer to the main processing (step S2007).

Figure 21:
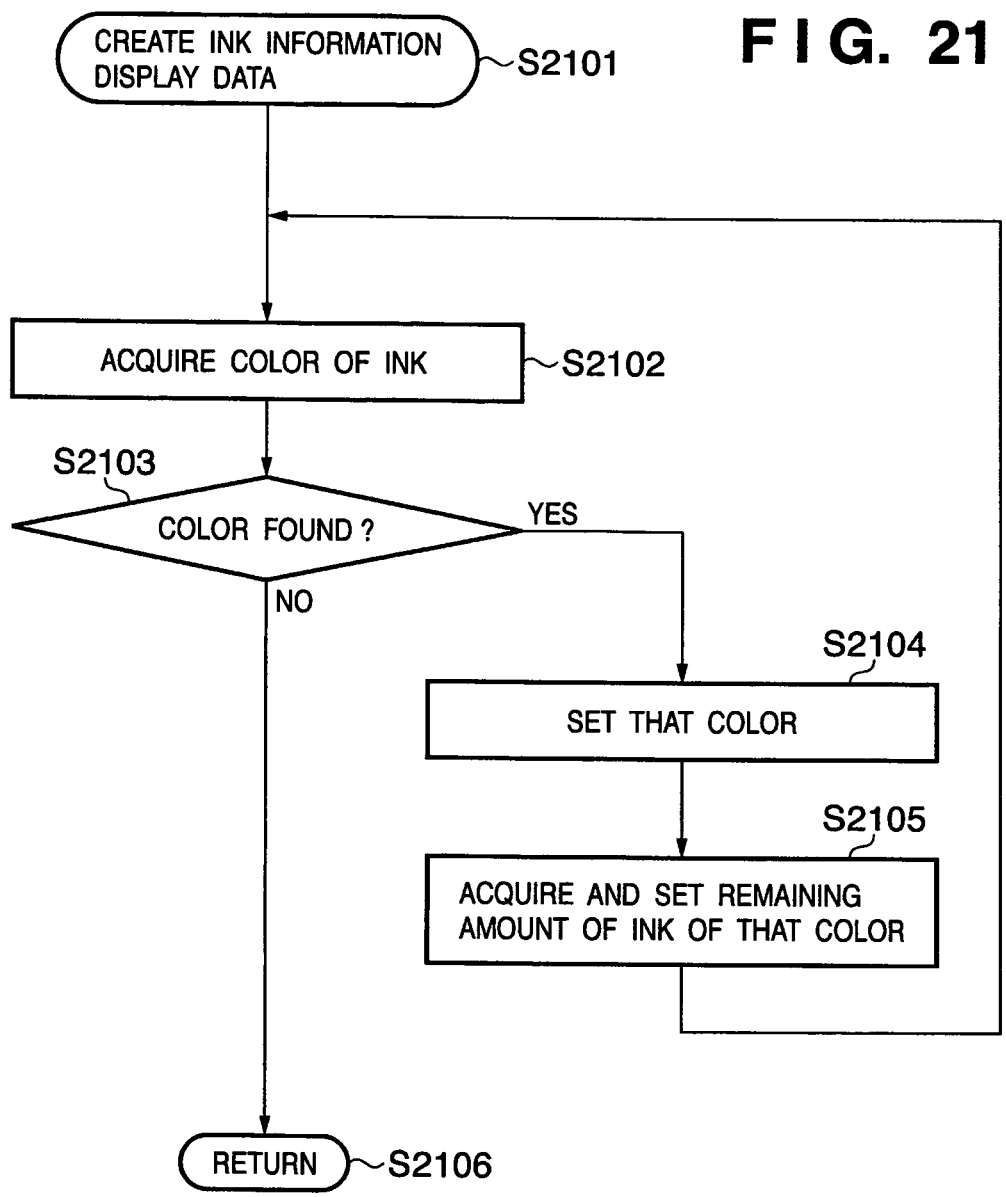
FIG. 21 is a flowchart showing creation processing of ink information display data in the application.

FIG. 21 is a flowchart showing the creation processing (step S1810 in FIG. 18) of ink information display data in the application according to this embodiment.

Referring to FIG. 21, the application 30 (status monitor) starts creation processing of ink information display data (step S2101). Next, the application 30 acquires the colors of the inks from the ink information returned as the definition of the schema shown in FIG. 6 as the argument of the IBidiSpl:: SendReov( ) function acquired in step S1809 in FIG. 18 (step S2102). If it is determined that the color information is detected (found) (step S2103), that color information is set in a return value storage buffer (memory) upon returning in step S2106 (step S2104). The remaining amount of the ink of that color is acquired and is set in the return value storage buffer (memory) upon returning in step S2106 (step S2105). The flow then returns to step S2102.

If no color information is detected (found) in step S2103, this means that processing for the inks of all the colors is completed, the colors ([Color] in FIG. 5), information indicating if the inks of the colors are installed (Installed in FIG. 5), and the remaining amounts of the inks of the colors (Level in FIG. 5) set in the return value storage buffer are returned to the main processing. The flow then returns to the main processing (step S2106).

The configuration of data processing programs which can be read out by the peripheral device control system which includes the information processing apparatus and peripheral device according to this embodiment will be described below with reference to the memory map shown in FIG. 22.

Figure 22:
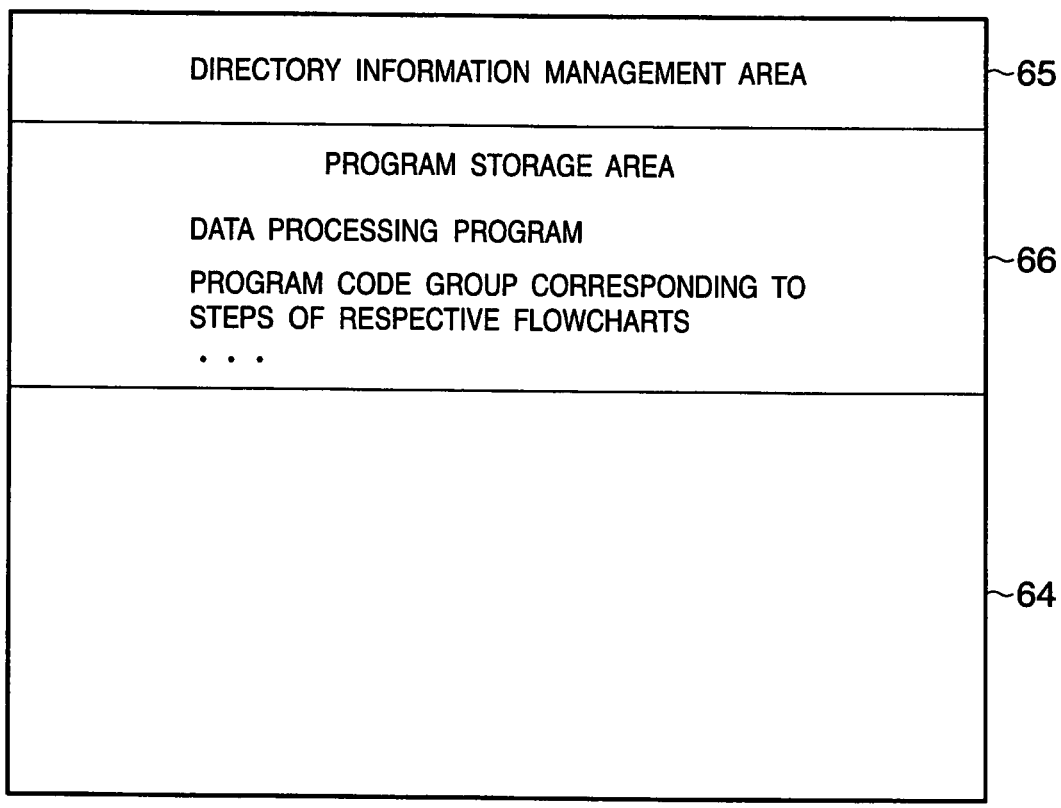
FIG. 22 shows the memory map of a storage medium that stores various data processing programs which can be read out by the peripheral device control system.

FIG. 22 shows the memory map of a storage medium which stores various data processing programs that can be read out by the peripheral device control system according to this embodiment. Note that information (e.g., version information, creator, and the like) used to manage programs stored in the storage medium may also be stored in this storage medium, and information (e.g., icons used to identifiably display programs and the like) depending on the OS and the like on the program read side may also be stored (although they are not particularly shown). Referring to FIG. 22, reference numeral 64 denotes a storage medium which comprises a hard disk in this example. Reference numeral 65 denotes a directory information management area. Data which belong to various programs are managed by the directory information management area 65. Reference numeral 66 denotes a program storage area which may also store a program used to install various programs in the information processing apparatus, a program for decompressing the installation program when it is compressed, and the like. The processes implemented by the respective flowcharts shown in FIGS. 15 to 21 in this embodiment are stored in this program storage area 66, and are executed. The respective functions that can be implemented upon execution of these flowcharts may be implemented by the information processing apparatus based on programs which are installed externally. In this case, the present invention can be applied even when an information group including programs is supplied to the information processing apparatus or peripheral device from a storage medium such as a CD-ROM, flash memory, flexible disk, or the like or an external storage medium via the network.

In this embodiment, the status monitor has been described as an example of the application 30. However, the present invention is not limited to this example. For example, other arbitrary applications which acquire information from the peripheral device and use it can effectively implement the present invention.

In the example of the above embodiment, the application (status monitor) 30 monitors the information and status of inks installed in the printer 3. However, the present invention is limited to this example. For example, the present invention can be effectively utilized in the acquisition of arbitrary information and status such as the operation state of the peripheral device, status such as warning and errors, the mounted states of options, and the like.

In the example of the above embodiment, the color ink-jet printer is used as an example of the printer. The present invention is not limited to this example, and other arbitrary printers such as a monochrome LBP or the like may be used.

In the example of the above embodiment, the personal computer is assumed as the information processing apparatus. The present invention is not limited to this example, and the present invention can be effectively applied to other arbitrary terminals which allow similar use methods such as a digital camera, digital video camera, DVD video player, game, set-top box, Internet home electric appliances, and the like.

In the above embodiment, the printer has been exemplified as the peripheral device. However, the present invention can also be applied to a copying machine, facsimile, scanner, digital camera, digital video camera, a device comprising combined functions of these devices, and the like as the peripheral device in addition to the printer.

In the example of the above embodiment, Windows® XP is used as the OS. However, the present invention is not limited to such specific OS, and other arbitrary OSs can be used.

In the above embodiment, the Bluetooth interface is used as an interface between the PC 1 and printer 3. However, the present invention is not limited to such specific interface. For example, other arbitrary interfaces such as USB, Ethernet®, wireless LAN (IEEE802.11a/b/g, etc.), IEEE1394, IrDA, parallel, serial, Picture Transfer Protocol over Internet Protocol (PTP/IP) developed by FotoNation Inc. <http://www.fotonaton.com/index.php>, PictBridge <http://www.cipajp/plctbridge/index_j.html> standardized by Camera & Imaging Products Association (CIPA), and the like may be used.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a flexible disk, hard disk, optical disk, magneto-optical disk, CD-ROM, CD-R, magnetid tape, nonvolatile memory card, ROM, and the like may be used. The functions of the above-mentioned embodiments may be implemented not only by executing the readout program code by the computer but also by some or all of actual processing operations executed by an OS (basic system or operating system) running on the computer on the basis of an instruction of the program code. Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, even when the version of the OS of the information processing apparatus is updated, and when the version of the firmware of the peripheral device is updated, optimal processing can be selected accordingly to control the peripheral device.

Upon selecting the optimal processing from the arrangement of the peripheral device control system, the optimal processing can be automatically selected without any special user operations, thus assuring high operability of the user.

Furthermore, since one application and one peripheral device control driver can achieve both the conventional specification and new specification, high user operability can be assured, and total cost can be reduced.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-193085, filed Jun. 30, 2005, which is hereby incorporated by reference herein in its entirety.

What is claimed is:

1. A peripheral device control method for a system which includes a peripheral device and an information processing apparatus on which a status monitor displaying status information of the peripheral device can be run, wherein
   said method at said information processing apparatus, as a function of said status monitor, comprises:
   a first version information acquisition step of acquiring version information of an operating system required to control said information processing apparatus;
   a determination step of determining whether the operating system of the version information acquired in said first version information acquisition step supports bidirectional communication in Bluetooth communication;
   a second version information acquisition step of acquiring version information of firmware required to control said peripheral device;
   a control method selection step of, if it is determined in said determination step that the operating system supports the bidirectional communication in Bluetooth communication, selecting a control method for monitoring status information of said peripheral device based on the version information, acquired in said second version information acquisition step, of firmware to control said peripheral device; and
   a control step of controlling said peripheral device in accordance with the control method selected in the control method selection step,
   wherein said peripheral device performs a printing process according to print data received from said information processing apparatus, and
   wherein, in said control method selection step, one of a first method of acquiring ink status information of said peripheral device by issuing a job and a second method of acquiring the status information of said peripheral device without issuing the job is selected, the job being different from the print data and including a command for requesting the ink status information.

2. The method according to claim 1, wherein said method at the information processing apparatus, as a function of said status monitor further comprises a third version information acquisition step of acquiring version information of a driver program required to control said peripheral device, and
   wherein in said control method selection step, a control method is selected based on the version information of the driver program acquired in said third version information acquisition step, if it is determined in said determination step the operating system supports bidirectional communication in Bluetooth communication, based on the version information acquired in said first version acquisition step.

3. A peripheral device control system having a processor which includes a peripheral device and an information processing apparatus on which a status monitor displaying status information of the peripheral device can be run, wherein said information processing apparatus, as a function of said status monitor, comprises:
   a first version information acquisition unit adapted to acquire version information of an operating system required to control said information processing apparatus;
   a determination unit adapted to determine whether the operating system of the version information acquired by said first version information acquisition unit supports bidirectional communication in Bluetooth communication;
   a second version information acquisition unit adapted to acquire version information of firmware required to control said peripheral device;
   a control method selection unit adapted to, if said determination unit determines that the operating system supports the bidirectional communication in Bluetooth communication, select a control method for monitoring status information of said peripheral device based on the version information, acquired by said second version information acquisition unit, of firmware to control said peripheral device; and a control unit adapted to control said peripheral device in accordance with the control method selected by said control method selection, wherein said peripheral device performs a printing process according to print data received from said information processing apparatus, and wherein the control method selection unit selects one of a first method of acquiring ink status information of said peripheral device by issuing a job and a second method of acquiring the status information of said peripheral device without issuing the job, the job being different from the print data and including a command for requesting the ink status information.

4. The system according to claim 3, wherein said information processing apparatus, as a function of said status monitor, further comprises a third version information acquisition unit adapted to acquire version information of a driver program required to control said peripheral device, and the control method selection unit selects a control method based on the version information of the driver program acquired by said third version information acquisition unit, if said determination unit determines, based on the version information acquired by said first version acquisition unit, that the operating system supports bidirectional communication in Bluetooth communication.

5. A control method of an information processing apparatus on which a status monitor displaying information of a peripheral device can be run, as a function status monitor for monitoring said peripheral device, the method comprising:

a first version information acquisition step of acquiring version information of an operating system required to control said information processing apparatus;

a determination step of determining whether the operating system of the version information acquired in said first version acquisition step supports bidirectional communication in Bluetooth communication;

a second version information acquisition step of acquiring version information of firmware required to control said peripheral device;

a control method selection step of, if it is determined in said determination step that the operating system supports the bidirectional communication in Bluetooth communication, selecting a control method for monitoring status information of said peripheral device based on the version information, acquired in said second version acquisition step, of firmware to control said peripheral device; and a control step of controlling said peripheral device in accordance with the control method selected in said control method selection step, wherein said peripheral device performs a printing process according to print data received from said information processing apparatus, and wherein, in said control method selection step, one of a first method of acquiring ink status information of said peripheral device by issuing a job and a second method of acquiring the status information of said peripheral device without issuing a job is selected, the job being different from the print data and including a command for requesting the ink status information.

6. The method according to claim 5, further comprising a third version information acquisition step of acquiring version information of a driver program required to control said peripheral device, and wherein, in said control method selection step, a control method is selected based on the version information of the driver program acquired in said third version information acquisition step, if it is determined in said determination step that the operating system supports bidirectional communication in Bluetooth based on the version information acquired in said first version acquisition step.

7. An information processing apparatus on which a status monitor displaying status information of a peripheral device can be run, as a function of said status monitor for monitoring said peripheral device, said apparatus comprising:

a first version information acquisition unit adapted to acquire version information of an operating system required to control said information processing apparatus;

a determination unit adapted to determine whether the operating system of the version information acquired by said first version information acquisition unit supports bidirectional communication in Bluetooth communication;

a second version information acquisition unit adapted to acquire version information of firmware required to control said peripheral device;

a control method selection unit adapted to, if said determination means determines that the operating system supports the bidirectional communication in Bluetooth communication, select a control method for monitoring status information of said peripheral device based on the version information, acquired by said second version information acquisition unit, of firmware to control said peripheral device; and a control unit adapted to control said peripheral device in accordance with the control method selected by said control method selection unit, wherein said peripheral device performs a printing process according to print data received from said information processing apparatus, and wherein said control method selection unit selects one of a first method of acquiring ink status information of said peripheral device by issuing a job and a second method of acquiring the status information of said peripheral device without issuing the job, the job being different from the print data and including a command for requesting the ink status information.

8. The apparatus according to claim 7, wherein said information processing apparatus, as a function of said status monitor, further comprises a third version information acquisition unit adapted to acquire version information of a driver program unit required to control said peripheral device, and said control method selection unit selects a control method based on the version information of the driver program acquired by said third version information acquisition unit, if said determination unit determines, based on the version information acquired by said first version acquisition unit, that the operating system supports bidirectional communication in Bluetooth communication.

9. A non-transitory computer readable storage medium storing a computer program which runs on an information processing apparatus and makes the information processing apparatus a status monitor displaying status information of a peripheral device, said computer program executes a method comprising:

a first version information acquisition step of acquiring version information of an operating system required to control said information processing apparatus;

a determination step of determining whether the operating system of the version information acquired in said first version acquisition step supports bidirectional communication in Bluetooth communication;

a second acquisition step of acquiring version information of firmware required to control said peripheral device;

a control method selection step of, if it is determined in said determination step that the operating system supports the bidirectional communication in Bluetooth communication, selecting a control method for monitoring status information of said peripheral device based on the version information, acquired in said second version acquisition step, of firmware to control said peripheral device; and a control step of controlling said peripheral device in accordance with the control method selected in said control method selection step, wherein said peripheral device performs a printing process according to print data received from said information processing apparatus, and wherein, in said control method selection step, one of a first method of acquiring ink status information of said peripheral device by issuing a job and a second method of acquiring the status information of said peripheral device without issuing a job is selected, the job being different from the print data and including a command for requesting the ink status information.

10. The medium according to claim 9, said method further comprising:

a third version information acquisition step of acquiring version information of a driver program required to control said peripheral device, and wherein, in said control method selection step, a control method is selected based on the version information of the driver program acquired in said third version information acquisition step, if it is determined in said determination step that the operating system supports bidirectional communication in Bluetooth based on the version information acquired in said first version acquisition step.

* * * * *